(12) United States Patent
Yamada et al.

(10) Patent No.: US 9,321,017 B2
(45) Date of Patent: Apr. 26, 2016

(54) GAS-SEPARATION MEMBRANE

(71) Applicant: NAGOYA INDUSTRIAL SCIENCE RESEARCH INSTITUTE, Nagoya-shi, Aichi (JP)

(72) Inventors: Yasuharu Yamada, Kyoto (JP); Mikako Takenaka, Kyoto (JP); Tomoyuki Suzuki, Kyoto (JP); Masako Miki, Kyoto (JP)

(73) Assignee: NAGOYA INDUSTRIAL SCIENCE RESEARCH INSTITUTE, Nagoya-Shi (JP)

( * ) Notice: Subject to any disclaimer, the term of this patent is extended or adjusted under 35 U.S.C. 154(b) by 0 days.

(21) Appl. No.: 14/374,132

(22) PCT Filed: Jan. 22, 2013

(86) PCT No.: PCT/JP2013/051163
§ 371 (c)(1),
(2) Date: Jul. 23, 2014

(87) PCT Pub. No.: WO2013/111732
PCT Pub. Date: Aug. 1, 2013

(65) Prior Publication Data
US 2015/0033945 A1  Feb. 5, 2015

(30) Foreign Application Priority Data

Jan. 24, 2012  (JP) ................. 2012-012226

(51) Int. Cl.
*B01D 71/70* (2006.01)
*B01D 71/62* (2006.01)
(Continued)

(52) U.S. Cl.
CPC .............. *B01D 71/70* (2013.01); *B01D 53/228* (2013.01); *B01D 67/0079* (2013.01);
(Continued)

(58) Field of Classification Search
CPC ............. B01D 53/228; B01D 67/0079; B01D 69/148; B01D 71/027; B01D 71/62; B01D 71/70; B01D 2323/30; C08G 73/06; C08G 73/22
USPC .................................................. 96/14; 95/51
See application file for complete search history.

(56) References Cited

U.S. PATENT DOCUMENTS 5,218,076 A * 6/1993 Madison et al. ............... 528/188
2005/0256296 A1* 11/2005 Kiefer et al. .................. 528/327
(Continued)

FOREIGN PATENT DOCUMENTS

JP     01-159024 A    6/1989
JP     2001-081193 A  3/2001
(Continued)

OTHER PUBLICATIONS

English language machine translation for JP 2006-299021. Retrieved from https://www4.j-platpat.go.jp on Feb. 5, 2016.*
(Continued)

*Primary Examiner* — Jason M Greene
(74) *Attorney, Agent, or Firm* — Birch, Stewart, Kolasch & Birch, LLP (57) ABSTRACT

A novel gas separation membrane having excellent gas permeability and gas separation performance, particularly carbon dioxide ($CO_2$) permeability and excellent separation performance of carbon dioxide to methane ($CH_4$) is provided. Moreover, a novel gas separation membrane having excellent heat resistance, chemical resistance and strength etc. is preferably provided.

A gas separation membrane comprising a resin comprising a branched polybenzoxazole has excellent gas permeability and gas separation performance, particularly excellent carbon dioxide ($CO_2$) permeability and excellent separation performance of carbon dioxide to methane ($CH_4$). The resin comprising a branched polybenzoxazole preferably has a cross-linked structure. Furthermore, the resin comprising a branched polybenzoxazole is preferably a hybrid with silica.

10 Claims, 3 Drawing Sheets

(51) Int. Cl.
*C08G 73/22* (2006.01)
*B01D 53/22* (2006.01)
*B01D 67/00* (2006.01)
*B01D 69/14* (2006.01)
*B01D 71/02* (2006.01)

(52) U.S. Cl.
CPC ............ *B01D 69/148* (2013.01); *B01D 71/62* (2013.01); *C08G 73/22* (2013.01); *B01D 71/027* (2013.01); *B01D 2323/30* (2013.01); *Y02P 20/152* (2015.11)

(56) References Cited

U.S. PATENT DOCUMENTS

| | | | |
|---|---|---|---|
| 2010/0071557 A1 | 3/2010 | Seiler et al. | |
| 2010/0133186 A1* | 6/2010 | Liu et al. | 95/51 |
| 2010/0331437 A1* | 12/2010 | Liu et al. | 521/146 |
| 2011/0014545 A1* | 1/2011 | Calundann et al. | 429/492 |
| 2012/0042777 A1* | 2/2012 | Lee et al. | 95/51 |
| 2012/0329958 A1* | 12/2012 | Freeman et al. | 525/425 |
| 2013/0012607 A1 | 1/2013 | Calundann et al. | |
| 2013/0324662 A1* | 12/2013 | Honda | 524/595 |

FOREIGN PATENT DOCUMENTS

| | | | | |
|---|---|---|---|---|
| JP | 3462652 B2 | 11/2003 | | |
| JP | 2005-538237 A | 12/2005 | | |
| JP | 2006-224097 A | 8/2006 | | |
| JP | 2006-299021 | * 11/2006 | ............ | C08G 73/22 |
| JP | 2006-299021 A | 11/2006 | | |
| JP | 2007-246772 A | 9/2007 | | |
| JP | 2010-514848 A | 5/2010 | | |
| WO | WO 2010/110975 A2 | 9/2010 | | |
| WO | WO 2011/142363 A1 | * 11/2011 | ............ | C08G 73/06 |
| WO | WO 2011/142363 A1 | 11/2011 | | |

OTHER PUBLICATIONS

International Search Report issued in PCT/JP2013/051163 dated May 7, 2013.
Robeson, "Correlation of separation factor versus permeability for polymeric membranes", Journal of Membrane Science, vol. 62, pp. 165-185, 1991.
Robeson, "The upper bound revisited", Journal of Membrane Science vol. 320, pp. 390-400, 2008.
International Preliminary Report on Patentability and Translation of the Written Opinion of the International Searching Authority (Forms PCT/IB/373 and PCT/ISA/237) issued Jul. 29, 2014, for International Application No. PCT/JP2013/051163.

* cited by examiner

GAS-SEPARATION MEMBRANE

TECHNICAL FIELD

The present invention relates to a gas separation membrane made of a resin comprising a branched polybenzoxazole. Moreover, the present invention relates to a gas separation membrane made of a resin comprising a branched polybenzoxazole/silica hybrid.

BACKGROUND ART

Recently, separation of a specific gas from a mixture of gases and purification (or refinement) of various gases etc. are actively studied with a polymer membrane as a gas separation membrane. For example, preparation of oxygen-rich air by using a gas separation membrane having high oxygen permeability, and usage of the oxygen-rich air in the fields of such as medical services and fuel systems etc. are studied. Therefore, the gas separation membrane is required to have high permeability to the specific gas and to have high selectivity of the gas compared to other gases. Moreover, such gas separation membrane is also required to be excellent in heat resistance, chemical resistance and strength etc., if the properties are necessary for the environment in which the membrane is used. Polyimides are often studied as a polymer for the gas separation membrane (please refer to Patent Documents 1-3).

On the other hand, it is reported that when permeation coefficient of a specific gas is improved with regard to a polymer membrane, selectivity of the gas to the other gases (separation factor of the gas) is lowered, that is, there is a trade-off relationship between the permeation coefficient and the separation factor, and as a result there is an upper limit boundary area (limiting line of upper limit for gas separation) (please refer to Non-patent Documents 1 and 2).

It is one object to obtain a polymer membrane having performance over at least one of the limiting lines of upper limit for gas separation reported by the Non-patent Documents 1 and 2. Intensive studies are carried out so as to obtain polymer membranes having such performance. Moreover, it is necessary to study various polymer membranes other than the polyimides, which is interesting academically and industrially.

PATENT DOCUMENTS

Patent Document 1: JP2001-81193A
Patent Document 2: JP2006-224097A
Patent Document 3: JP3462652B
Non-patent Document 1: Lloyd M. Robeson, Journal of Membrane Science, 62 (1991) 165-185, Elsevier B.V., Amsterdam
Non-patent Document 2: Lloyd M. Robeson, Journal of Membrane Science, 320 (2008) 390-400, Elsevier B.V., Amsterdam

SUMMARY OF INVENTION

Problems to be Solved by Invention

The present invention is carried out considering the above background art. The purpose of the present invention is to provide a novel gas separation membrane having excellent gas permeability and gas separation performance, particularly carbon dioxide ($CO_2$) permeability and excellent separation performance of carbon dioxide to methane ($CH_4$). Moreover, the purpose of the invention is preferably to provide a novel gas separation membrane having excellent heat resistance, chemical resistance and strength etc.

Method for Solving Problems

Since resins having a branched structure are expected to have a weaker intermolecular force, to have more voids (or more free volume) and to have larger gas transmission rate, the present inventors have intensively studied. They have prepared a gas separation membrane by using a resin comprising a branched polybenzoxazole and investigated the properties of the same. They have surprisingly found that the above problems can be solved advantageously and completed the present invention.

That is, in an aspect, the present invention provides a gas separation membrane comprising a resin comprising branched polybenzoxazole.

In an embodiment, the present invention provides the gas separation membrane, wherein the resin comprising a branched polybenzoxazole has a cross-linked structure.

In another embodiment, the present invention provides the gas separation membrane, wherein the resin comprising a branched polybenzoxazole is a hybrid with silica.

In a preferable embodiment, the present invention provides the gas separation membrane, wherein the silica is formed by using a silane coupling agent, and moreover, the silica may be formed by using an alkoxysilane.

In a preferable aspect, the present invention provides a gas separation membrane comprising a resin comprising a branched polybenzoxazole, wherein the branched polybenzoxazole is derived from a branched polyamide obtainable by reacting a polycarboxylic acid compound comprising a tri- or more-valent carboxylic acid compound with a (di)hydroxy (di)amine.

Furthermore, in the present specification, the "carboxylic acid compound" comprises not only compounds containing a carboxyl group but also derivatives thereof such as carboxylic acid halide compounds and active ester compounds etc.

Effects of Invention

Since the gas separation membrane according to the present invention comprises a resin comprising a branched polybenzoxazole, it has excellent gas permeability and gas separation performance, particularly excellent carbon dioxide ($CO_2$) permeability and excellent separation performance of carbon dioxide to methane ($CH_4$).

With regard to the gas separation membrane according to the present invention, when the resin comprising a branched polybenzoxazole has a cross-linked structure, film-forming property and forming processability etc. of the resin comprising a branched polybenzoxazole are more improved.

With regard to the gas separation membrane according to the present invention, when the resin comprising a branched polybenzoxazole is a hybrid with silica, the carbon dioxide ($CO_2$) permeability and/or the separation performance of carbon dioxide to methane ($CH_4$) are/is more improved.

With regard to the gas separation membrane according to the present invention, when the silica is formed by using a silane coupling agent and moreover the silica may be formed by using an alkoxysilane, the carbon dioxide ($CO_2$) permeability and/or the separation performance of carbon dioxide to methane ($CH_4$) are/is more improved.

Since the gas separation membrane according to the present invention comprises a resin comprising a branched polybenzoxazole, wherein the branched polybenzoxazole is derived from a branched polyamide obtainable by reacting a polycarboxylic acid compound comprising a tri- or more-valent carboxylic acid compound with a (di)hydroxy(di) amine, the gas separation membrane has excellent gas permeability and gas separation performance, particularly excellent carbon dioxide ($CO_2$) permeability and excellent separation performance of carbon dioxide to methane ($CH_4$).

EMBODIMENTS FOR CARRYING OUT INVENTION

The gas separation membrane according to the present invention comprises (or is made of) a resin comprising a branched polybenzoxazole. In the meantime, since polybenzoxazole (PBO) is excellent in heat resistance, electric insulation and mechanical characteristic etc., it is intensively studied as a material used for such as insulation films, surface protection films and coating films in electronic devices (please refer to WO2011/142363A1 and JP2006-299021A etc.). However, studies on the PBO as a gas separation membrane have never been reported.

In the present specification, the "branched polybenzoxazole" means a polymer which has a repeating unit comprising a chemical structure of "benzoxazole" and has at least three terminals (or molecular ends) in one molecule. The "branched polybenzoxazole" may have a linear structure as long as the present objective gas separation membrane can be obtained. The "branched polybenzoxazole" preferably has a lot of branched structure, and more preferably has a branched dendritic structure. Therefore, the "branched polybenzoxazole" according to the present invention comprises a branched polybenzoxazole having a linear structure.

The "branch" is preferably formed by employing a tri- or more-valent carboxylic acid compound as a starting material. The "branched polybenzoxazole" according to the present invention is more preferably derived from a branched polyamide obtainable by the reaction of a polycarboxylic acid compound comprising a tri- or more-valent carboxylic acid compound with a (di)hydroxy(di)amine. Since the "branched polybenzoxazole" may have a linear structure, the above mentioned polyacrboxylic acid compound may comprise a (di)carboxylic acid compound.

The "benzoxazole" contained in the repeating unit is not particularly limited as long as it is generally understood as the "benzoxazole" and the present objective gas separation membrane can be obtained. The "polybenzoxazole" preferably has a repeating unit comprising any chemical structure represented by the following chemical formulas (1)-(3).

[Chemical Formula 1]

(1)

[Chemical Formula 2]

(2)

[Chemical Formula 3]

(3)

(The "Ar" represents an aromatic group in the above chemical formulas (1)-(3).)

Figure 1:
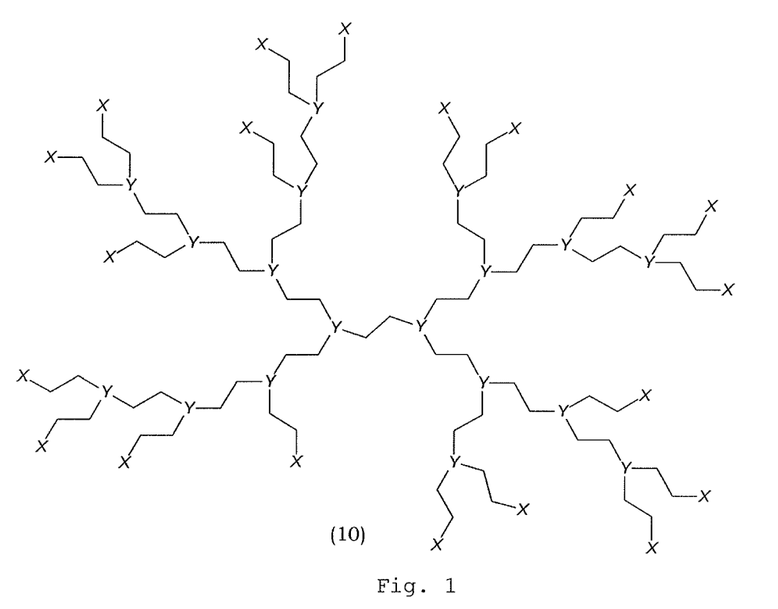
FIG. 1 is a schematic illustration exemplifying a structure of a branched polybenzoxazole.

FIG. 1 illustratively demonstrates a structure of a general "branched polybenzoxazole" (10). It has a lot of branches and has a dendritic shape. It can have a lot of functional groups at the increased polymer terminals. In FIG. 1, the functional groups at the polymer terminals are shown by X. In general, the X is an amino group, a hydroxyl group, a carboxylic acid group, a halide group thereof and an active ester thereof considering the below mentioned method for producing it. Furthermore, the branching portions of the polymer molecule are shown by Y. In general, the Y is a part of a tri- or more-valent carboxylic acid compound which can form a branch. The part contains, for example, aromatic groups which may have a substituent(s), and contains, for example, benzene rings, biphenyl rings, naphthalene rings, diazabenzene rings, triazine rings, tetrazine rings, quinoline rings, diazanaphthalene tetraazanaphthalene rings, pteridine rings, acridine rings, phenoxazine rings and phenothiazine rings etc., which rings may have a substituent(s). In the following FIGS. 2-4, the X and Y have the same meanings.

The production method of the "branched polybenzoxazole" is not particularly limited as long as the objective "branched polybenzoxazole" can be obtained. The "branched polybenzoxazole" can be produced with reference to a production method disclosed in for example, WO2011/142363A1 etc. One example of the detail will be described in the present examples. A chemical equation of the one example of the production method is shown below.

[Chemical Formula 4]

A branched polybenzoxazole (PBO) (10) can be produced by reacting a polycarboxylic acid compound (or multi-valent carboxylic acid compound) (11) comprising a tri- or more-valent carboxylic acid compound with a (di)hydroxy(di)amine (12) to obtain a branched polyamide (13) (a precursor of the branched polybenzoxazole (10)), and by being derived from the obtainable branched polyamide (13). The objective branched polybenzoxazole (10) can be obtained by optionally heating, dehydrating and ring-closing the obtainable branched polyamide (13).

Further, the reaction can be improved more effectively by reacting salts, which salts are produced during the reaction of the polycarboxylic acid compound (11) with the (di)hydroxy (di)amine (12), with basic compounds such as triethylamine and pyridine or oxirane compounds such as ethylene oxide, propylene oxide, epichlorohydrin and butylene oxide to remove the salts from the reaction system. In the present specification, the production method by using propylene oxide is particularly referred to as "PO method".

In addition, previous reaction of a silylation agent such as N-trimethylsilylimidazole (TMSI), N,O-bis-(trimethylsilyl)trifluoroacetamide (BSTFA), N,O-bis-(trimethylsilyl)acetamide (BSA), N-methyl-N-(trimethyl-silyl)trifluoroacetamide (MSTFA) and N,N-dimethyltrimethyl-silylamine (TMSDMA) with the (di)hydroxy(di)amine (12) would promote efficiently the reaction with the polycarboxylic acid compound (11) to give the objective material having a high molecular weight. In the present specification, the production method by using the silylation agent is particularly referred to as "silylation method".

Various objective "branched polybenzoxazoles" (10) can be produced by suitably selecting the tri- or more-valent carboxylic acid compound and the (di)hydroxy(di)amine (12) contained in the starting materials.

Examples of the tri- or more-valent carboxylic acid compound (tri- or more-valent compounds containing carboxyl groups) contain tri- or more-valent aromatic carboxylic acids such as benzene-1,3,5-tricarboxylic acid, benzene-1,2,4-tricarboxylic acid, benzene-1,2,5-tricarboxylic acid, 2,4,6-tribromobenzene-1,3,5-tricarboxylic acid, 2,4,6-tris(dodecyloxy)benzene-1,3,5-tricarboxylic acid, 4,4',4''-benzene-1,3,5-triyl-trisbenzoic acid, 3,3',3''-benzene-1,3,5-triyl-trisbenzoic acid, 3,3',4,4'-biphenyltetracarboxylic acid, 3,3',4,4'-(1,1'-hexafluoro-isopropylidenebiphenyl)tetracarboxylic acid and 1,2,3,4,5,6-benzenehexacarboxylic acid. Benzene-1,3,5-tricarboxylic acid is more preferably used among them. Examples of the tri- or more-valent carboxylic acid derivative contain acid halides and active esters etc. of the tri- or more-valent carboxylic acids. The acid halides of the tri- or more-valent carboxylic acids are more preferably used as the tri- or more-valent carboxylic acid derivatives. These are used alone or in combination. However, the above mentioned tri- or more-valent aromatic carboxylic acids are just examples. Known compounds can be used as long as they are not against the spirit of the present invention. Moreover, the polycarboxylic acid compound is preferably an aromatic polycarboxylic acid compound.

Examples of the (di)hydroxy(di)amine contain aromatic (di)hydroxy(di)amines such as 2,4-diamino-1,5-benzenediol, 4,4'-diamino-3,3'-dihydroxybiphenyl, 3,3'-diamino-4,4'-dihydroxybiphenyl, 2,2'-bis(3-amino-4-hydroxyphenyl)ketone, 2,2-bis(3-amino-4-hydroxyphenyl)sulfide, 2,2-bis(3-amino-4-hydroxyphenyl)ether, 2,2-bis(3-amino-4-hydroxyphenyl)-hexafluoropropane, 2,2-bis(3-amino-4-aminophenyl)sulfone, 2,2-bis(3-amino-4-hydroxyphenyl)propane, 2,2-bis(3-hydroxy-4-aminophenyl)propane, 2,2-bis(3-hydroxy-4-aminophenyl)-methane, 2,2-bis(3-amino-4-hydroxyphenyl)hexafluoropropane, 2,2-bis(3-amino-4-hydroxyphenyl)difluoromethane, 2,4-diaminoresorcinol, 2,4-diamino-3-methylresorcinol, 4,6-diaminoresorcinol, 4,6-diamino-2-methylresorcinol, 9,9-bis(4-(4-amino-3-hydroxy)phenoxyphenyl)fluorene, 9,9-bis(4-(4-amino-3-hydroxy)phenoxy-3-methylphenyl)fluorene, 9,9-bis(4-(3-amino-4-hydroxy)phenoxyphenyl)fluorene, 9,9-bis(4-(3-amino-4-hydroxy)phenoxy-3-methylphenyl)fluorene, 9,9-bis(3-amino-4-hydroxyphenyl)fluorene, 9,9-bis(2-methyl-5-cyclohexyl-4-(4-amino-3-hydroxy)phenoxyphenyl)fluorene, 3,3'-diamino-4,4'-dihydroxybiphenylether, 3,3'-diamino-4,4'-dihydroxy-2,2'-dimethylbiphenylether, 4,4'-diamino-3,3'-dihydroxy-2,2'-dimethylbiphenylether, 1,1'-(1,4-phenylenebis(1-methylethylidene))bis((3-cyclohexyl-2-methyl)-4-(4-amino-3-hydroxy)phenoxyphenyl)propane, 2,2-bis(3-cyclohexyl-4-(4-amino-3-hydroxyphenoxy)phenyl)propane, 1,1-bis(3-cyclohexyl-4-(4-amino-3-hydroxy)phenoxyphenyl)-cyclohexane and so on. 2,2-Bis(3-amino-4-hydroxyphenyl)-hexafluoropropane and 9,9-bis(3-amino-4-hydroxyphenyl)-fluorene are more preferably used in these compounds. These can be used alone or in combination. However, the above mentioned aromatic (di)hydroxy(di)amines are just examples. Known compounds can be used as long as they are not against the spirits of the present invention.

In the present invention, the "branched polybenzoxazoles" can further comprise a "linear (or straight chain)" structure. Distribution and ratio etc. of the branched structure to the linear structure are not particularly limited as long as the objective gas separation membrane according to the present invention can be obtained.

Figure 2:
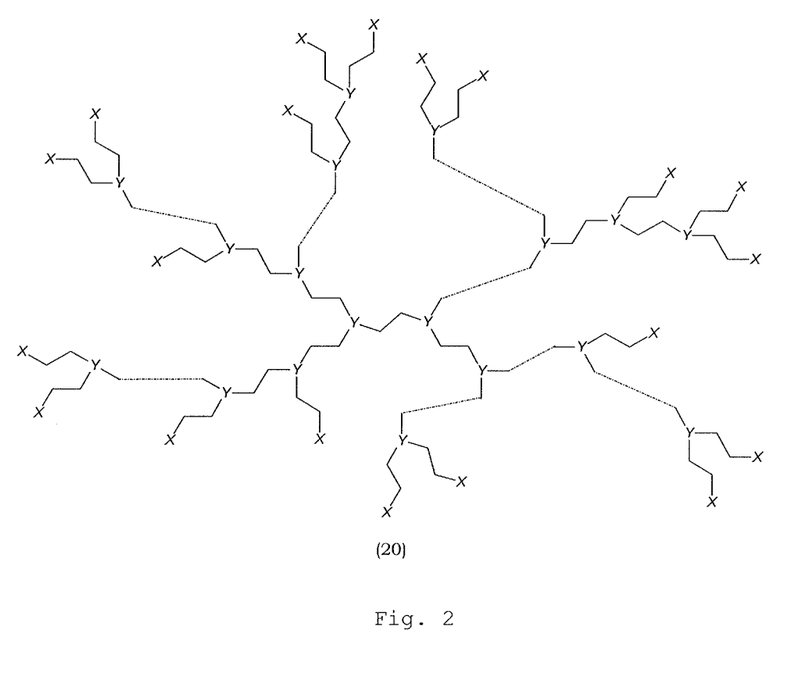
FIG. 2 is a schematic illustration exemplifying a structure of a branched polybenzoxazole having a linear structure.

A structure of a branched polybenzoxazole having a linear structure is schematically illustrated in FIG. 2. It has a lot of branches (Y) which are increased in a dendritic shape, and also has a linear structure indicated by a dotted line. Moreover, it has a lot of functional groups (X) at the increased polymer terminals. Further, the meanings of the X and Y are the same as those in FIG. 1.

The production method of the branched polybenzoxazole having a linear structure is not particularly limited as long as the objective branched polybenzoxazole having a linear structure can be obtained. The branched polybenzoxazole having a linear structure can be produced by using a method similar to that of the above branched polybenzoxazole (please refer to WO2011/142363A1 and JP2006-299021A). One example of the detail will be described in the present examples. A chemical equation of the one example of the production method is shown below.

[Chemical Formula 5]

A branched polybenzoxazole having a linear structure (20) can be produced by reacting an above mentioned polycarboxylic acid compound (II) further comprising a (di) carboxylic acid compound with a (di)hydroxy(di)amine (12) to given a branched polyamide having a linear structure (23) (a precursor of the branched polybenzoxazole having a linear structure (20)), and by being derived from the obtainable branched polyamide having a linear structure (23). The objective branched polybenzoxazole having a linear structure (20) can be produced by using a method similar to the above mentioned method for producing the "branched polybenzoxazoles" by means of the branched polyamide having a linear structure (23) in place of the branched polyamide (13). Various objective branched polybenzoxazoles having a linear structure (20) can be produced by suitably selecting the tri- or more-valent carboxylic acid compound, the (di)carboxylic acid compound and the (di)hydroxy(di)amine (12) contained in the starting materials.

Examples of the tri- or more-valent carboxylic acid compound and the (di)hydroxy(di)amine contain compounds similar to those mentioned above.

Examples of the (di)carboxylic acid (di-valent compound containing carboxyl groups) contain aromatic (di)carboxylic acids such as isophthalic acid, terephthalic acid, 3-fluoroisophthalic acid, 2-fluoroisophthalic acid, 3-fluorophthalic acid, 2-fluorophthalic acid, 2-fluoroterephthalic acid, 2,4,5,6-tetrafluoroisophthalic acid, 3,4,5,6-tetrafluorophthalic acid, 4,4'-hexafluoro-isopropylidenediphenyl-1,1-dicarboxylic acid, 2,2'-bis(trifluoromethyl)-4,4'-diphenylenedicarboxylic acid, 4,4'-oxydiphenyl-1,1-dicarboxylic acid, 3,3'-oxybisbenzoic acid, 3,4'-oxybisbenzoic acid, 4,4'-oxybisbenzoic acid, 4,4'-biphenyldicarboxylic acid, 3,3'-methylenebisbenzoic acid, 3,4'-methylenebisbenzoic acid, 4,4'-methylenebisbenzoic acid, 3,3'-difluoromethylenebisbenzoic acid, 3,4'-difluoromethylenebisbenzoic acid, 4,4'-difluoromethylenebisbenzoic acid, 3,3'-sulfonylbisbenzoic acid, 3,4'-sulfonylbisbenzoic acid, 4,4'-sulfonylbisbenzoic acid, benzophenone-3,3'-dicarboxylic acid, benzophenone-3,4'-dicarboxylic acid, benzophenone-4,4'-dicarboxylic acid, 3,3'-propylenebisbenzoic acid, 3,4'-propylenebisbenzoic acid, 4,4'-propylenebisbenzoic acid, 3,3'-(hexafluoro-tri-methylene)bisbenzoic acid, 3,4'-(hexafluorotrimethylene)-bisbenzoic acid, 4,4'-(hexafluoro-trimethylene)bisbenzoic acid, 3,3'-(m-phenylenebisoxy)bisbenzoic acid, 3,4'-(m-phenylenebisoxy)bisbenzoic acid, 4,4'-(m-phenylenebisoxy)-bisbenzoic acid, 3,3'-(p-phenylenebisoxy)bisbenzoic acid, 3,4'-(p-phenylenebisoxy)bisbenzoic acid, 4,4'-(p-phenylenebisoxy)bisbenzoic acid, 3,3'-(1,4-phenylenebis(1-methylethylidene))bisbenzoic acid, 3,4'-(1,4-phenylenebis(1-methylethylidene))bisbenzoic acid, 4,4'-(1,4-phenylenebis(1-methylethylidene))bisbenzoic acid, 3,3'-[isopropylidenebis[(4,1-phenylene)oxy]]bisbenzoic acid, 3,4'-[isopropylidenebis[(4,1-phenylene)oxy]]bisbenzoic acid, 4,4'-[isopropylidenebis[(4,1-phenylene)oxy]]bisbenzoic acid, 3,3'-[(hexafluoroisopropylidene)bis[(4,1-phenylene)oxy]]-bisbenzoic acid, 3,4'-[(hexafluoroisopropylidene)bis[(4,1-phenylene)oxy]]bisbenzoic acid, 4,4'-[(hexafluoro-isopropylidene)bis[(4,1-phenylene)oxy]] bisbenzoic acid, 3,3'-[sulfonylbis[(4,1-phenylene)oxy]] bisbenzoic acid, 3,4'-[sulfonylbis[(4,1-phenylene)oxy]] bisbenzoic acid, 4,4'-[sulfonylbis[(4,1-phenylene)oxy]] bisbenzoic acid and 4,4'-(difluoromethylene)bis(2,3,5,6-tetrafluorobenzoic acid) etc. Examples of the (di)carboxylic acid derivative contain acid halides and active esters etc. of the (di)carboxylic acids. These are used alone or in combination. However, the above mentioned aromatic (di)carboxylic acids are just examples. Known compounds can be used as long as they are not against the spirits of the present invention.

The resin comprising a branched polybenzoxazole according to the present invention preferably contains branched polybenzoxazoles produced as mentioned above, and may contain other resin as long as the present objective gas separation membrane can be obtained. Examples of such other resin contain linear polybenzoxazoles, polybenzimidazoles, polybenzoxadines, polyimides, polyamides, polyurethanes, polyether ether ketones and polyphenyleneoxides etc. This may cause to improve film-forming property and formability (or processability) etc. of the resin comprising a branched polybenzoxazole.

Furthermore, the resin comprising a branched polybenzoxazole according to the present invention can have various cross-linked structures as long as the present objective gas separation membrane can be obtained. Such cross-linked structures can be formed by employing various cross-linking agents. Examples of such cross-linking agents contain tetracarboxylic dianhydrides, diamines, isocyanate compounds, carboxylic acid compounds and carboxylic acid halide compounds (hereinafter referred to as "carboxylic acid (halide) compounds"), epoxy compounds, hydroxy compounds and polysiloxane compounds etc. The cross-linked structures are preferably formed by using tetracarboxylic dianhydrides, diamines, isocyanate compounds, carboxylic acid (halide) compounds, epoxy compounds, hydroxy compounds and polysiloxane compounds etc. Intermolecular cross-links are formed by using these cross-linking agents, and film-forming property and formability etc. of the resin comprising a branched polybenzoxazole can be improved.

Examples of the tetracarboxylic dianhydrides contains pyromellitic dianhydride, oxydiphthalic dianhydride, 3,3',4,4'-benzophenonetetracarboxylic dianhydride, 3,3',4,4'-diphenylsulfonetetracarboxylc dianhydride, 4,4'-(hexafluoroisopropylidene)diphthalic dianhydride and 2,2'-bis[(dicarboxyphenoxy)phenyl]propane dianhydride etc.

Examples of the diamines contain phenylene diamine, diaminodiphenylmethane, diaminodiphenylether, diaminodiphenyl, diaminobenzophenone, 2,2-bis[(4-aminophenoxy)-phenyl]propane, bis[4-aminophenoxyphenyl]sulfone, 2,2-bis[(4-aminophenoxy)phenyl]hexafluoropropane, bis(4-amino-phenoxy)benzene, 4,4'-[phenylenebis(1-methylethylidene)]-bisaniline, 2,2-bis(4-aminophenyl)hexafluoropropane and 9,9-bis(aminophenyl)fluorene etc.

Examples of the isocyanate compounds contain 2,4-toluene diisocyanate, 2,6-toluene diisocyanate, hexa-methylene diisocyanate, 2,4'-diphenylmethane diisocyanate, 4,4'-diphenylmethane diisocyanate, 1,5-naphthalene diisocyanate, 2,6-naphthalene diisocyanate, 4,4-dicyclohexylmethane diisocyanate, 1,3-phenylene-bismethylene diisocyanate, isophorone diisocyanate, tetra-methylxylylene diisocyanate and lysine triisocyanate etc.

Examples of the carboxylic acid (halide) compounds contain aromatic dicarboxylic acids (halides) such as terephthalic acid, terephthalic acid dichloride (or terephthaloyl chloride), terephthalic acid dibromide (or terephthaloyl bromide), phthalic acid, phthalic acid dichloride, phthalic acid dibromide, isophthalic acid, isophthalic acid dichloride, isophthalic acid dibromide, 4,4'-diphenyldicarboxylic acid, 4,4'-diphenyldicarboxylic acid chloride, 4,4'-diphenyldicarboxylic acid bromide, 4,4'-diphenyl ether dicarboxylic acid, 4,4'-diphenyl ether dicarboxylic acid chloride, 4,4'-diphenyl ether dicarboxylic acid bromide, 4,4'-benzophenonedicarboxylic acid, 4,4'-benzophenonedicarboxylic acid chloride, 4,4'-benzophenonedicarboxylic acid bromide, 4,4'-diphenoxyethanedicarboxylic acid, 4,4'-diphenoxyethanedicarboxylic acid chloride, 4,4'-diphenoxyethanedicarboxylic acid bromide, 4,4'-diphenylsulfonedicarboxylic acid, 4,4'-diphenylsulfonedicarboxylic acid chloride, 4,4'-diphenylsulfonedicarboxylic acid bromide, 2,6-naphthalenedicarboxylic acid, 2,6-naphthalenedicarboxylic acid chloride and 2,6-naphthalenedicarboxylic acid bromide etc.; alicyclic dicarboxylic acids such as 1,2-cyclohexane dicarboxylic acid, 1,2-cyclohexane dicarboxylic acid chloride, 1,2-cyclohexane dicarboxylic acid bromide, 1,3-cyclohexane dicarboxylic acid, 1,3-cyclohexane dicarboxylic acid chloride, 1,3-cyclohexane dicarboxylic acid bromide, 1,4-cyclohexane dicarboxylic acid, 1,4-cyclohexane dicarboxylic acid chloride and 1,4-cyclohexane dicarboxylic acid bromide etc.; aliphatic dicarboxylic acids such as malonic acid, malonic acid dichloride, malonic acid dibromide, succinic acid, succinic acid dichloride, succinic acid dibromide, glutaric acid, glutaric acid dichloride, glutaric acid dibromide, adipic acid, adipic acid dichloride, adipic acid dibromide, pimelic acid, pimelic acid dichloride, pimelic acid dibromide, suberic acid, suberic acid dichloride, suberic acid dibromide, azelaic acid, azelaic acid dichloride, azelaic acid dibromide, sebacic acid, sebacic acid dichloride and sebacic acid dibromide etc.

Examples of the epoxy compounds contain such as monoallyldiglycidyl-isocyanuric acid, sorbitol polyglycidyl ether, polyglycerol polyglycidyl ether, pentaerythritol polyglycidyl ether, diglycerol polyglycidyl ether, glycerol polyglycidyl ether, trimethylolpropane polyglycidyl ether, resorcinol diglycidyl ether, neopentylglycol diglycidyl ether, 1,6-hexanediol diglycidyl ether, hydrogenated bisphenol-A diglycidyl ether, ethyleneglycol diglycidyl ether, polyethyleneglycol diglycidyl ether, propyleneglycol diglycidyl ether, polypropyleneglycol diglycidyl ether, polybutadiene diglycidyl ether, diglycidyl o-phthalate, hydroquinone diglycidyl ether, diglycidyl terephthalate, dibromoneopentylglycol diglycidyl ether, resorcin diglycidyl ether, sorbitan polyglycidyl ether, bisphenol-A diglycidyl ester, bisphenol-S diglycidyl ether and dimer acid diglycidyl ester etc.

Examples of the hydroxy compounds contain hydroquinone, resorsin, 4,4'-dihydroxybiphenyl, 4,4'-dihydroxydiphenyl ketone, 2,2-bis(4-hydroxyphenyl)propane, 1,1-bis(4-hydroxy-phenyl)cyclohexane, 1,1-bis(4-hydroxyphenyl)-3,3,5-trimethylcyclohexane, bis(4-hydroxyphenyl)methane, 1,1-bis(4-hydroxyphenyl)ethane, 2,2-bis(4-hydroxyphenyl)butane, 1,1-bis(4-hydroxyphenyl)-1-phenylethane, bis(4-hydroxy-phenyl)diphenylmethane, 2,2-bis(4-hydroxy-3-methylphenyl)-propane, 2,2-bis(3-phenyl-4-hydroxyphenyl)propane, 2,2-bis(4-hydroxy-3-t-butylphenyl)propane, 9,9-bis(4-hydroxy-phenyl)fluorene, 9,9-bis(4-hydroxy-3-methylphenyl)fluorene, 1,3-bis{2-(4-hydroxyphenyl)propyl}benzene, 1,4-bis{2-(4-hydroxyphenyl)propyl}benzene, 2,2-bis(4-hydroxyphenyl)-1,1,1,3,3,3-hexafluoropropane, 2,2-bis(4-hydroxy-3,5-dimethylphenyl)propane, 2,2-bis(4-hydroxy-3,5-dibromo-phenyl)propane, 4,4'-dihydroxybiphenyl-3,3',5,5'-tetramethyl-4,4'-dihydroxybiphenyl, bis(4-hydroxyphenyl)-sulfide, bis(4-hydroxyphenyl)ether and bis(4-hydroxyphenyl)ketone etc.

Examples of the polysiloxane compounds contain compounds represented by the following formula (I). Concretely, diaminopolysiloxanes, dihydroxypolysiloxanes and dicarboxypolysiloxanes etc. are exemplified:

$$A_3SiO-(Ra_xSiO_{y/2})_n-SiA_3 \quad (1)$$

[wherein in the above formula,

A is selected from a group consisting of amino groups, epoxy group, carbinol groups, hydroxy group, carboxyl group and halogens, Ra is selected from hydrogen atom, alkyl groups, aryl groups and unsaturated alkyl groups, x is an integer from 0 to 3, and y is an integer from 1 to 4 (x+y=4), and n is a positive integer.]

In the present invention, polysilsesquioxanes represented by the following formula (II) can be employed as a polysiloxane compound.

$$(RSiO_{3/2})_n \quad (II):$$

[In the above formula, R is amino groups, epoxy group, carbinol groups, hydroxy group, carboxyl group and/or halogens.]

These cross-linking agents such as tetracarboxylic dianhydrides, diamines, isocyanate compounds, carboxylic acid (halide) compounds, epoxy compounds, hydroxy compounds and polysiloxane compounds etc. can be used alone or in combination. However, the above mentioned tetracarboxylic dianhydrides, diamines, isocyanate compounds, carboxylic acid (halide) compounds, epoxy compounds, hydroxy compounds and polysiloxane compounds are just examples. Known compounds can be used as long as they are not against the spirits of the present invention.

The above mentioned resin comprising a branched polybenzoxazole is preferably a hybrid with silica.

In the present specification, the "hybrid with silica" means that a polybenzoxazole portion (block or phase) made of a branched polybenzoxazole connects and integrates with a silica portion (block or phase) by a covalent bond to form a hybrid structure.

The "silica portion" is not particularly limited as long as it has a unit representing a chemical formula: $SiO_2$ and the present objective gas separation membrane can be obtained. It may have another inorganic oxide.

While such silica portion is integrated with the above mentioned "polybenzoxazole portion" by a covalent bond, such integration is not particularly limited as long as the present objective gas separation membrane can be obtained.

Figure 3:
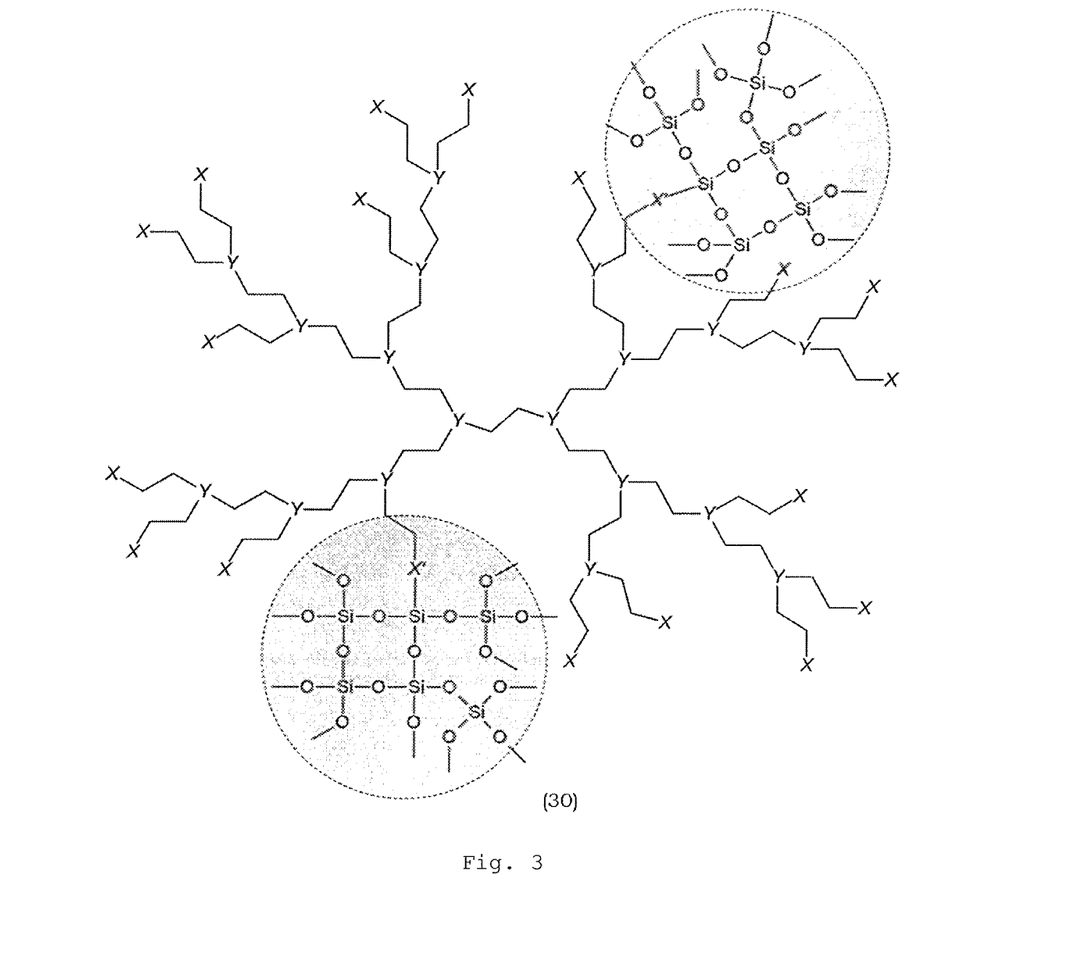
FIG. 3 is a schematic illustration exemplifying a structure of a branched polybenzoxazole/silica-hybrid.
Figure 4:
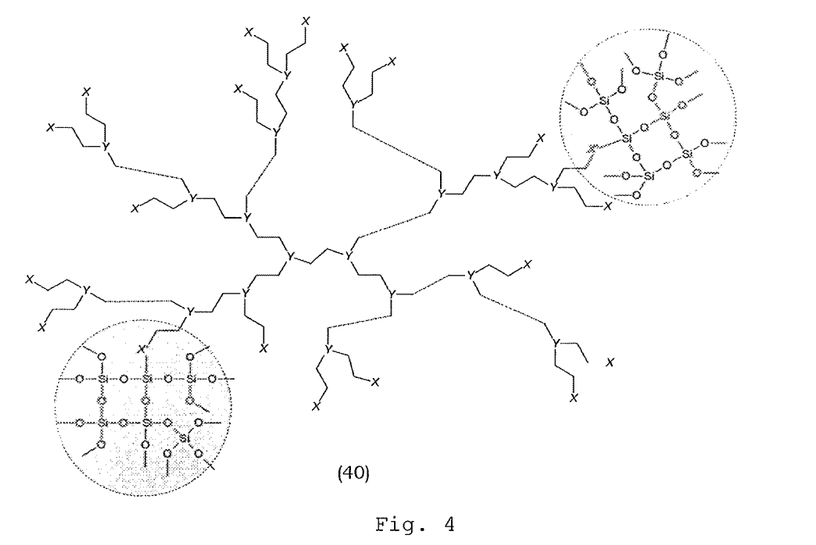
FIG. 4 is a schematic illustration exemplifying a structure of a branched polybenzoxazole having a linear structure/silica-hybrid.

Examples (30) and (40) of such "polybenzoxazole/silica hybrid" are schematically illustrated in FIGS. 3-4. In FIG. 3, a polybenzoxazole portion represented by a branched dendritic shape is connected and integrated with a silica portion represented by $SiO_2$ unit through a covalent bond to demonstrate a hybrid structure (30). In FIG. 4, a polybenzoxazole portion represented in both a branched dendritic shape and a linear shape is connected and integrated with a silica portion represented by $SiO_2$ unit through a covalent bond to demonstrate a hybrid structure (40). A portion connecting the polybenzoxazole portion with the silica portion is represented by X', which is concretely corresponding to a portion derived from below mentioned "silane compounds having an alkoxysilyl group and a carboxylic acid group, amino group or isocyanate group". Moreover, meanings of the X, Y and dotted lines are the same as those in FIGS. 1-2.

The "hybrid of the resin comprising a branched polybenzoxazole with silica" and the method for producing the same are not particularly limited as long as the present objective gas separation membrane can be obtained. For example, it can be relatively easily produced (or derived) from the above mentioned precursor "polyamides" (13) and (23) (please refer to Patent Document 1). One example of the details will be demonstrated in the present examples. Chemical equations of the one example are illustrated below.

[Chemical Formula 6]

(13)

-continued (30)

[Chemical Formula 7]

(23)

(40)

These "polyamides" (13) and (23) have amino groups, hydroxy groups or carboxyl acid groups, or acid halides or active esters of the carboxylic acid at the terminals.

These polyamides are allowed to react a "silane compound having a carboxylic acid group, amino group or isocyanate group, and an alkoxysilyl group" (hereafter, referred to as a "compound (51)") or a derivative thereof.

As a result, polyamides having an alkoxysilyl group at the terminal (31) and (41) can be obtained by reacting the amino groups, hydroxy groups or carboxyl acid groups, or acid halides or active esters of the carboxylic acid located at the terminals of the polyamides (13) and (23) with the carboxylic acid group, amino group or isocyanate group in the compound (51).

Furthermore, when water is present, a part of the alkoxysilyl groups are hydrolyzed by the water to give hydroxysilyl groups.

In the present invention, the "silane compound having a carboxylic acid group, amino group or isocyanate group, and an alkoxysilyl group" (51) is not particularly limited as long as the present objective gas separation membrane can be obtained. Moreover, the "carboxylic acid group" further contains carboxylic acid derivatives. It contains concretely a carboxylic acid group (—COOH), an acid anhydride group (—CO—O—CO—), and derivatives thereof which may be halides (—COHAL: in the present specification, the HAL is any one of atoms selected from F, Cl, Br or I) and active esters. Furthermore, the "amino group" contains primary amino groups and secondary amino groups, and the amino group preferably contains the primary amino groups.

Examples of the "compound" (51) contain for example, silane compounds represented by the following formula (52):

$$Z\text{-}A\text{-}Si(R^1)_m\text{---}(OR^2)_n:$$ Formula (52)

$R^1$ and $R^2$: a hydrocarbon group,
m: 0, 1 or 2,
n: 1, 2 or 3,
m+n: 3,
Z: a carboxylic acid group, an acid anhydride group, a derivative thereof which may be an acid halide (the halogen is any one of atoms of F, Cl, Br and I) or an active ester, an amino group (which contains primary amino groups and secondary amino groups), or an isocyanate group,
A: a divalent hydrocarbon group (wherein a secondary amino group may be inserted).

Examples of the compound (51) concretely contains 3-aminopropyltrimethoxysilane, 3-aminopropyltriethoxysilane, aminophenyltrimethoxysilane, 3-aminopropylmethyldiethoxy-silane, aminophenyldimethylmethoxysilane, aminophenyltrimethoxysilane, (aminoethylaminomethyl) phenethyl-trimethoxysilane, dimethylmethoxysilylbenzoic acid, 3-(triethoxysilyl)propylsuccinic anhydride, 1-isocyanate-4-triethoxysilylbenzene, 1-isocyanate-3-triethoxysilylbenzene, 1-isocyanate-4-trimethoxysilyl-benzene, 1-isocyanate-3-trimethoxysilylbenzene and isocyanate propyltrimethoxysilane etc.

In addition, the reactions of the above mentioned compound (51) with the polyamides (13) and (23) can be carried out under a reaction condition similar with that known by a person skilled in the art.

The polyamides having an alkoxysilyl group (31) and (41) can be obtained as mentioned above.

Silica portions can be formed by the polycondensation of the polyamides having an alkoxysilyl group in the presence of water by means of sol-gel method, if necessary, together with a compound (hereinafter referred to as a "compound (53)") represented by the following chemical formula (54):

$R^1$ and $R^2$: a hydrocarbon group,
m: 0, 1, 2 or 3,
n: 1, 2, 3 or 4,
m+n: 4.

Examples of the above mentioned compound (53) contain tetramethoxysilane, tetraethoxysilane, methyltrimethoxysilane, ethyltrimethoxysilane, phenyltrimethoxysilane, methyltriethoxysilane, ethyltriethoxysilane, phenyl-triethoxysilane, dimethyldimethoxysilane, diethyldimethoxy-silane, diphenyldimethoxysilane, dimethyldiethoxysilane, diethyldiethoxysilane and diphenyldiethoxysilane etc.

Such compound (53) can be used alone or in combination.

Content of the silica contained in the gas separation membrane according to the present invention may change depending on amounts of the above mentioned compounds (51) and (53). In general, the content of the silica in the gas separation membrane is preferably 0.05-95 wt %, more preferably 0.1-50 wt % based on the total (100 wt %) of the gas separation membrane.

When the silica content of the present gas separation membrane is increased, the heat resistance, elastic modulus and hardness are improved. However, the material itself of the membrane may be fragile, and cracks are easy to form and impact resistance is easy to decrease. Therefore, it is preferred that the amount of the compound (53) is selected to control the silica content suitably. However, since the suitable content of the silica depends on the intended purpose of the gas separation membrane, the content of the silica is not particularly limited as long as the gas separation membrane can be employed.

The sol-gel reaction of the above mentioned polyamides having an alkoxysilyl group, if necessary, in the presence of the compound (53) is preferably carried out at a temperature of 100° C. or less, advantageously 50° C. or less.

The polyamides hybridized with silica (32) and (42) obtained in this way are, if necessary heated, dehydrated and ring-closed to give branched polybenzoxazoles hybridized with silica (30) and (40). Therefore, the branched polybenzoxazoles hybridized with silica (30) and (40) can be derived and produced from the polyamides (13) and (23).

The gas separation membrane according to the present invention can be obtained by forming (or shaping) the polybenzoxazole (which may be hybridized with silica) according to the present invention by means of a known suitable method. The polyamide (which may be hybridized with silica), which is a precursor of the polybenzoxazole, may be shaped (or formed), and then may be heated, ring-closed and dehydrated to produce a film-like polybenzoxazole (which may be hybridized with silica). The method for production is not limited as long as the gas separation membrane according to the present invention can be obtained.

Shape of the present gas separation membrane is not particularly limited as long as the present membrane can be employed as a gas separation membrane. Examples of the shape contains flat membrane-like, hollow-fiber membrane-like, monolayer film, multi-layer film, porous membrane, spiral type membrane, non-porous membrane, homogeneous membrane, and asymmetric membrane comprising a dense layer and a porous layer etc.

The gas separation membrane according to the present invention obtainable in this way surprisingly has excellent gas permeability and gas separation performance, particularly excellent carbon dioxide ($CO_2$) permeability and excellent separation performance of carbon dioxide to methane ($CH_4$).

Moreover, when the branched polybenzoxazole according to the present invention is a hybrid with silica, the carbon dioxide ($CO_2$) permeability and/or the separation performance of carbon dioxide to methane ($CH_4$) can be more improved.

Hereinafter, the present invention will be explained in detail by way of present examples and comparative examples. The present invention is not limited by the following examples as long as the present invention is not against the spirits.

EXAMPLES

Example 1

Branched PBO

Inside of a three-necked flask (100 ml) equipped with a stirrer, a nitrogen introduction tube and a calcium chloride tube was replaced with nitrogen gas, and then 2,2-bis(3-amino-4-hydroxyphenyl)hexafluoro-propane (6FAP) (1.10 g, 3 mmol) was metered in and completely dissolved by addition of N-methyl-2-pyrrolidone (NMP) (17 mL). Then, propylene oxide (PO) (0.9 mL) was added and the mixture was stirred at room temperature for 1 hour. After the obtained mixed solution was cooled to −20° C., benzene-1,3,5-tricarboxylic acid trichloride (BTC) (0.425 g, 1.6 mmol) was added to the mixed solution, the solution was stirred for 2 hours, and then further stirred for 20 hours to give a NMP solution of a precursor of a branched polybenzoxazole.

The NMP solution of a precursor of a branched polyoxazole was put into ion-exchange water to precipitate the precursor of a branched polybenzoxazole in a solid form. Then, the polymer solid was filtered and recovered, and washed enough by ion-exchange water, and then dried in vacuo at 85° C. for 12 hours.

The obtained polymer solid (1 g) was metered in a sample bottle, and was dissolved again by adding NMP (3 mL). 4,4'-(Hexafluoroisopropylidene)diphthalic dianhydride (0.131 g) was added to this solution and it was stirred for 1 minute. The obtained reaction solution was casted on a polyester sheet, dried at 85° C. for 3 hours to produce a membrane. Then, the membrane was peeled off from the polyester sheet, fixed to a metal frame, and heat-treated under a nitrogen atmosphere at 200° C. for 1 hour and at 420° C. for 3 hours to give a branched polybenzoxazole (Branched PBO (6FAP-BTC)).

Thermogravimetric-differential thermal analysis measurement (TG-DTA measurement) was carried out by means of an EXSTAR TG/DTA6300 (trade name) produced by Seiko Instruments Inc. so as to evaluate thermal properties of the branched PBO (6FAP-BTC). The measurement was carried out under a nitrogen atmosphere in a temperature range from 25 to 800° C. and at a rate of temperature increase of 10° C./min. According to the obtained TG-DTA curve, the thermal decomposition temperature (at which 5% of the weight is decreased ($T_d^5$)) seems to be 518° C. (please refer to Table 1). Further, TG-DTA measurement was carried out under an air atmosphere, and the silica content was obtained according to the residue burned at 800° C.

In addition, gas permeation measurement of the branched PBO (6FAP-BTC) was carried out according to Constant-Volume Method (Japanese Industrial Standard (JIS) testing method: JIS Z 1707) under 1 atm at 25° C. The obtained gas permeability coefficient (P) and the permselectivity (or gas separation factor) (a) are shown in Table 2.

Example 2

Branched PBO Having Linear Structure

Inside of a three-necked flask (200 ml) equipped with a stirrer, a nitrogen introduction tube and a calcium chloride tube was replaced with nitrogen gas, and then 6FAP (2.93 g, 8 mmol) was metered in and completely dissolved by addition of NMP (100 mL). Then, PO (3.0 mL) was added and the mixture was stirred for 1 hour at room temperature, and the obtained mixed solution was cooled to −20° C. A mixed solution, in which BTC (0.265 g, 1 mmol) and 4,4'-oxybis (benzoic acid chloride) (OBC) (1.77 g, 6 mmol) were previously solved in NMP (30 mL), was gradually added into the above obtained mixed solution, stirred for 2 hours, and then further stirred for 20 hours to give a NMP solution of a precursor of a branched polybenzoxazole having a linear structure.

The NMP solution of a precursor of a branched polybenzoxazole having a linear structure was put into ion-exchange water to precipitate the precursor of a branched polybenzoxazole having a linear structure in a solid form. Then, the polymer solid was filtered and recovered, and washed enough by ion-exchange water, and then dried in vacuo for 12 hours at 85° C.

The obtained polymer solid (1 g) was metered in a sample bottle, and dissolved again by adding NMP (3 mL). The solution was casted on a polyester sheet, and dried for 3 hours at 85° C. to produce a membrane. Then, the membrane was peeled off from the polyester sheet, fixed to a metal frame, and heat-treated under a nitrogen atmosphere for 1 hour at 200° C. and for 3 hours at 420° C. to give a branched polybenzoxazole having a linear structure (branched/linear PBO (6FAP-BTC/OBC)).

TG-DTA measurement of the branched/linear PBO (6FAP-BTC/OBC) was carried out under the condition mentioned in Example 1. The $T_d^5$ was 534° C. (please refer to Table 1). Further, TG-DTA measurement was carried out under an air atmosphere, and the silica content was obtained according to the residue burned at 800° C. The result is presented in Table 1.

In addition, gas permeation measurement of the branched/linear PBO (6FAP-BTC/OBC) was carried out under the condition mentioned in Example 1. The obtained P and a are presented in Table 2.

Example 3

Branched PBO+Silane Coupling Agent

The precursor solid of the branched polybenzoxazole (1 g) obtained in Example 1 was metered in a sample bottle, and dissolved again by adding NMP (3 mL). 3-Triethoxysilylpropylsuccinic anhydride (TEOSPSA) (0.0907 g) was added to the solution, the solution was stirred for 3 hours, one drop of 1N hydrochloric acid was added to the solution, and the solution was further stirred for 12 hours.

The solution was casted on a polyester sheet, dried for 3 hours at 85° C. to produce a membrane. Then, the membrane was peeled off from the polyester sheet, fixed to a metal frame, and heat-treated under a nitrogen atmosphere for 1 hour at 200° C. and for 3 hours at 420° C. to give a branched polybenzoxazole-silica hybrid (branched PBO (6FAP-BTC)-SiO$_2$HBD).

TG-DTA measurement of the branched PBO (6FAP-BTC)-SiO$_2$HBD was carried out under the condition mentioned in Example 1. The $T_d^5$ was 513° C. (please refer to Table 1). Further, TG-DTA measurement was carried out under an air atmosphere, and the silica content was obtained according to the residue burned at 800° C. The result is presented in Table 1.

In addition, gas permeation measurement of the branched PBO (6FAP-BTC)-SiO$_2$HBD was carried out under the condition mentioned in Example 1. The obtained P and α are presented in Table 2.

Example 4

Branched PBO Having Linear Structure+Silane Coupling Agent

The precursor solid of branched polybenzoxazole having a linear structure (1 g) obtained in Example 2 was metered in a sample bottle, and dissolved again by adding NMP (3 mL). TEOSPSA (0.0689 g) was added to the solution, the solution was stirred for 3 hours, one drop of 1N hydrochloric acid was added to the solution, and the solution was further stirred for 12 hours.

The reaction solution was casted on a polyester sheet, dried for 3 hours at 85° C. to produce a membrane. Then, the membrane was peeled off from the polyester sheet, fixed to a metal frame, and heat-treated under a nitrogen atmosphere for 1 hour at 200° C. and for 3 hours at 420° C. to give a branched polybenzoxazole having a linear structure-silica hybrid (branched/linear PBO (6FAP-BTC/OBC)-SiO$_2$HBD).

TG-DTA measurement of the branched/linear PBO (6FAP-BTC/OBC)-SiO$_2$HBD was carried out under the condition mentioned in Example 1. The $T_d^5$ was 518° C. (please refer to Table 1). Further, TG-DTA measurement was carried out under an air atmosphere, and the silica content was obtained according to the residue burned at 800° C. The result is presented in Table 1.

In addition, gas permeation measurement of the branched/linear PBO (6FAP-BTC/OBC)-SiO$_2$HBD was carried out under the condition mentioned in Example 1. The obtained P and a are presented in Table 2.

Examples 5-9

Branched PBO+Silane Coupling Agent+Alkoxysilane

The precursor solid of a branched polybenzoxazole (1 g) obtained in Example 1 was metered in a sample bottle, and was dissolved again by adding NMP (3 mL). TEOSPSA (0.0907 g) was added to the solution, and the solution was stirred for 3 hours. Then, a predetermined amount of tetramethoxysilane (TMOS) or methyltrimethoxysilane (MTMS), ion-exchange water and one drop of 1N hydrochloric acid were added to the solution, and the solution was further stirred for 12 hours. Kinds of the alkoxysilanes used in the examples are presented in Table 1.

The reaction solution was casted on a polyester sheet, dried for 3 hours at 85° C. to produce a membrane. Then, the membrane was peeled off from the polyester sheet, fixed to a metal frame, and heat-treated under a nitrogen atmosphere for 1 hour at 200° C. and for 3 hours at 420° C. to give a branched polybenzoxazole-silica hybrid (branched PBO (6FAP-BTC)-SiO$_2$HBD).

TG-DTA measurement of the branched PBO (6FAP-BTC)-SiO$_2$HBD was carried out under the condition mentioned in Example 1 to obtain the $T_d^5$. Further, TG-DTA measurement was carried out under an air atmosphere, and the silica content was obtained according to the residue burned at 800° C. The $T_d^5$ and the silica content obtained in each example are presented in Table 1.

In addition, gas permeation measurement of the branched PBO (6FAP-BTC)-SiO$_2$HBD was carried out under the condition mentioned in Example 1. The obtained P and a are presented in Table 2.

Example 10

Branched PBO+Silane Coupling Agent

The precursor solid of a branched polybenzoxazole (1 g) obtained in Example 1 was metered in a sample bottle, and was dissolved again by adding NMP (3 mL). 3-Triethoxysilylpropylsuccinic anhydride (TEOSPSA) (0.0907 g) was added to the solution, and the solution was stirred for 3 hours. Then, one drop of 1N hydrochloric acid was added to the solution, and the solution was further stirred for 12 hours.

The reaction solution was casted on a polyester sheet, dried for 3 hours at 85° C. to produce a membrane. Then, the membrane was peeled off from the polyester sheet, fixed to a metal frame, and heat-treated under a nitrogen atmosphere for 1 hour at 200° C. and for 3 hours at 400° C. to give a branched polybenzoxazole-silica hybrid (branched PBO (6FAP-BTC)-SiO$_2$HBD).

TG-DTA measurement of the branched PBO (6FAP-BTC)-SiO$_2$HBD was carried out under the condition mentioned in Example 1. The $T_d^5$ was 513° C. (please refer to Table 1). Further, TG-DTA measurement was carried out under an air atmosphere, and the silica content was obtained according to the residue burned at 800° C. The result is presented in Table 1.

In addition, gas permeation measurement of the branched PBO (6FAP-BTC)-SiO$_2$HBD was carried out under the condition mentioned in Example 1. The obtained P and a are presented in Table 2.

Examples 11-15

Branched PBO+Silane Coupling Agent+Alkoxysilane

The precursor solid of a branched polybenzoxazole (1 g) obtained in Example 1 was metered in a sample bottle, and dissolved again by adding NMP (3 mL). TEOSPSA (0.0907 g) was added to the solution, and the solution was stirred for 3 hours. Then, a predetermined amount of TMOS or MTMS, ion-exchange water and one drop of 1N hydrochloric acid were added to the solution, and the solution was further stirred for 12 hours. Kinds of the alkoxysilanes used in examples are presented in Table 1.

The reaction solution was casted on a polyester sheet, dried for 3 hours at 85° C. to produce a membrane. Then, the membrane was peeled off from the polyester sheet, fixed to a metal frame, and heat-treated under a nitrogen atmosphere for 1 hour at 200° C. and for 3 hours at 400° C. to give a branched polybenzoxazole-silica hybrid (branched PBO (6FAP-BTC)-SiO$_2$HBD).

TG-DTA measurement of the branched PBO (6FAP-BTC)-SiO$_2$HBD was carried out under the condition mentioned in Example 1 to obtain the $T_d^5$. Further, TG-DTA measurement was carried out under an air atmosphere, and the silica content was obtained according to the residue burned at 800° C. The $T_d^5$ and silica content obtained in each of examples are presented in Table 1.

In addition, gas permeation measurement of the branched PBO (6FAP-BTC)-SiO$_2$HBD was carried out under the condition mentioned in Example 1. The obtained P and a are presented in Table 2.

Example 16

Branched PBO+Silane Coupling Agent

Inside of a three-necked flask (100 ml) equipped with a stirrer, a nitrogen introduction tube and a calcium chloride tube was replaced with nitrogen gas, and then 6FAP (2.20 g, 6 mmol) was metered in and completely dissolved by addition NMP (30 mL of). Then, N,O-bis(trimethylsilyl)-acetamide (BSA) (4.88 g, 24 mmol) was added, and the mixture was stirred for 1 hour at room temperature. The obtained mixed solution was cooled to −20° C. BTC (0.85 g, 3.2 mmol), which was previously dissolved in NMP (30 mL), was added to the mixed solution, and the mixture was stirred for 1 hour. Then, the reaction mixture was returned to room temperature, and further stirred for 5 hours to give a NMP solution of a precursor of a branched polybenzoxazole.

In addition, the NMP solution of a precursor of a branched polybenzoxazole was put into ion-exchange water to precipitate the precursor of a branched polybenzoxazole in a solid form. Then, the polymer solid was filtered and recovered, and washed enough with ion-exchange water, and then dried in vacuo for 12 hours at 85° C.

The obtained precursor solid of a branched polybenzoxazole (1 g) was metered in a sample bottle, and dissolved again by adding NMP (3 mL). TEOSPSA (0.0907 g) was added to this solution, and the solution was stirred for 3 hours. Then one drop of 1N hydrochloric acid was added, the mixture was further stirred for 12 hours.

The obtained reaction solution was casted on a polyester sheet, and dried for 3 hours at 85° C. to produce a membrane. Then, the membrane was peeled off from the polyester sheet, fixed to a metal frame, and heat-treated under a nitrogen atmosphere for 1 hour at 200° C. and for 3 hours at 420° C. to give a branched polybenzoxazole-silica hybrid (Branched PBO (6FAP-BTC)-SiO$_2$HBD).

TG-DTA measurement of the branched PBO (6FAP-BTC)-SiO$_2$HBD was carried out under the condition mentioned in Example 1. The T$_d^5$ was 483° C. (please refer to Table 1). Further, TG-DTA measurement was carried out under an air atmosphere, and the silica content was obtained according to the residue burned at 800° C. The results are presented in Table 1.

In addition, gas permeation measurement of the branched PBO (6FAP-BTC)-SiO$_2$HBD was carried out under the condition mentioned in Example 1. The obtained P and a are presented in Table 2.

Examples 17-20

Branched PBO+Silane Coupling Agent+Alkoxysilane

The precursor solid of a branched polybenzoxazole (1 g) obtained in Example 16 was metered in a sample bottle, and dissolved again by adding NMP (3 mL). TEOSPSA (0.0907 g) was added to the solution, and the solution was stirred for 3 hours. Then, a predetermined amount of TMOS or MTMS, ion-exchange water and one drop of 1N hydrochloric acid were added, and the solution was further stirred for 12 hours. Kinds of the alkoxysilanes used in examples are presented in Table 1.

The reaction solution was casted on a polyester sheet, dried for 3 hours at 85° C. to produce a membrane. Then, the membrane was peeled off from the polyester sheet, fixed to a metal frame, and heat-treated under a nitrogen atmosphere for 1 hour at 200° C. and for 3 hours at 420° C. to give a branched polybenzoxazole-silica hybrid (branched PBO (6FAP-BTC)-SiO$_2$HBD).

TG-DTA measurement of the branched PBO (6FAP-BTC)-SiO$_2$HBD was carried out under the condition mentioned in Example 1 to obtain the T$_d^5$. Further, TG-DTA measurement was carried out under an air atmosphere, and the silica content was obtained according to the residue burned at 800° C. The T$_d^5$ and silica content obtained in each of examples are presented in Table 1.

In addition, gas permeation measurement of the branched PBO (6FAP-BTC)-SiO$_2$HBD was carried out under the condition mentioned in Example 1. The obtained P and a are presented in Table 2.

Example 21

Branched PBO+Silane Coupling Agent, Carboxylic Acid Terminal

Inside of a three-necked flask (100 ml) equipped with a nitrogen introduction tube and a calcium chloride tube was replaced with nitrogen, and then 6FAP (2.20 g, 6 mmol) was metered in and completely dissolved by adding NMP (45 mL). Then, N,O-bis(trimethylsilyl)acetamide (BSA) (4.88 g, 24 mmol) was added, and the mixture was stirred at room temperature for 1 hour.

On the other hand, inside of another three-necked flask (200 ml) equipped with a stirrer, a nitrogen introduction tube and a calcium chloride tube was replaced with nitrogen, and then NMP (30 mL) was metered in and cooled to −20° C., and then BTC (1.59 g, 6 mmol) was added and dissolved.

The previously prepared NMP solution of 6FAP was put into the NMP solution of BTC, and stirred for 1 hour. The reaction mixture was returned to room temperature and further stirred for 5 hours to give a NMP solution of a precursor of a branched polybenzoxazole.

In addition, the NMP solution of a precursor of a branched polybenzoxazole was put into ion-exchange water to precipitate the precursor of a branched polybenzoxazole in a solid form. Then, the polymer solid was filtered and recovered, and washed enough by ion-exchange water, and then dried in vacuo for 12 hours at 85° C.

The obtained precursor solid of a branched polybenzoxazole (1 g) was metered in a sample bottle, and dissolved again by adding NMP (3 mL). Isocyanate propyltrimethoxysilane (IRTrMOS) (0.162 g) was added to the solution and stirred for 3 hours, and then one drop of 1N hydrochloric acid was added, and the solution was stirred for 12 hours.

The reaction solution was casted on a polyester sheet, dried for 3 hours at 85° C. to produce a membrane. Then, the membrane was peeled off from the polyester sheet, fixed to a metal frame, and heat-treated under a nitrogen atmosphere for 1 hour at 200° C. and for 3 hours at 450° C. to give a branched polybenzoxazole-silica hybrid (branched PBO (6FAP-BTC)-SiO$_2$HBD).

TG-DTA measurement of the branched PBO (6FAP-BTC)-SiO$_2$HBD was carried out under the condition mentioned in Example 1. The T$_d^5$ was 490° C. (please refer to Table 1). Further, TG-DTA measurement was carried out under an air atmosphere, and the silica content was obtained according to the residue burned at 800° C. The result is presented in Table 1.

In addition, gas permeation measurement of the branched PBO (6FAP-BTC)-SiO$_2$HBD was carried out under the condition mentioned in Example 1. The obtained P and a are presented in Table 2.

Comparative Example 1

Linear PBO+Silane Coupling Agent

Inside of a three-necked flask (100 ml) equipped with a stirrer, a nitrogen introduction tube and a calcium chloride tube was replaced with nitrogen, and then 6FAP (2.20 g, 6 mmol) was metered in and completely dissolved by adding NMP (21 mL). Then propylene oxide (PO) (1.8 mL) was added, and the solution was stirred at room temperature for 1 hour. The obtained reaction solution was cooled to −20° C., OBC (1.74 g, 5.9 mmol) was added, and the solution was stirred for 2 hours and further stirred at a room temperature for 20 hours to give a NMP solution of a precursor of a linear polybenzoxazole.

In addition, the NMP solution of a precursor of a linear polybenzoxazole was put into ion-exchange water to precipitate the precursor of a linear polybenzoxazole in a solid form. Then, the polymer solid was filtered and recovered, and washed enough by ion-exchange water, and then dried in vacuo for 12 hours at 85° C.

The obtained precursor solid of a linear polybenzoxazole (1 g) was metered in a sample bottle, and dissolved again by adding NMP (3 mL). TEOSPSA (0.0174 g) was added to the solution, and it was stirred for 3 hours, and then one drop of 1N hydrochloric acid was added, and the solution was stirred for 12 hours.

The reaction solution was casted on a polyester sheet, and dried for 3 hours at 85° C. to produce a membrane. Then, the membrane was peeled off from the polyester sheet, fixed to a metal frame, and heat-treated heated under a nitrogen atmosphere for 1 hour at 200° C. and for 3 hours at 400° C. to give a linear polybenzoxazole-silica hybrid (Linear PBO(6FAP-OBC)-SiO$_2$HBD).

TG-DTA measurement of the linear PBO(6FAP-OBC)-SiO$_2$HBD was carried out under the condition mentioned in Example 1. The T$_d^5$ was 525° C. (please refer to Table 1). Further, TG-DTA measurement was carried out under an air atmosphere, and the silica content was obtained according to the residue burned at 800° C. The result is presented in Table 1.

In addition, gas permeation measurement of the linear PBO (6FAP-OBC)-SiO$_2$HBD was carried out under the condition mentioned in Example 1. The obtained P and a are presented in Table 2.

Comparative Example 2

Linear PBO+Silane Coupling Agent

Inside of a three-necked flask (100 ml) equipped with a stirrer, a nitrogen introduction tube and a calcium chloride tube was replaced with nitrogen, and then 6FAP (1.83 g, 5 mmol) was metered in and completely dissolved by adding NMP (14 mL). Then BSA (4.07 g, 20 mmol) was added, and the solution was stirred at room temperature for 1 hour. The obtained reaction solution was cooled to −20° C., OBC (1.43 g, 4.85 mmol) was added, and the solution was stirred for 1 hours. Then the reaction mixture was returned to room temperature, and further stirred for 5 hours to give a NMP solution of a precursor of a linear polybenzoxazole.

In addition, the NMP solution of a precursor of a linear polybenzoxazole was put into ion-exchange water to precipitate the precursor of a linear polybenzoxazole in a solid form. Then, the polymer solid was filtered and recovered, and washed enough by ion-exchange water, and then dried in vacuo for 12 hours at 85° C.

The obtained precursor solid of a linear polybenzoxazole (1 g) was metered in a sample bottle, and dissolved again by adding NMP (3 mL). TEOSPSA (0.0174 g) was added to the solution, and it was stirred for 3 hours, and then one drop of 1N hydrochloric acid was added, and the solution was stirred for 12 hours.

The reaction solution was casted on a polyester sheet, and dried for 3 hours at 85° C. to produce a membrane. Then, the membrane was peeled off from the polyester sheet, fixed to a metal frame, and heat-treated heated under a nitrogen atmosphere for 1 hour at 200° C. and for 3 hours at 420° C. to give a linear polybenzoxazole-silica hybrid (linear PBO (6FAP-OBC)-SiO$_2$HBD).

TG-DTA measurement of the linear PBO(6FAP-OBC)-SiO$_2$HBD was carried out under the condition mentioned in Example 1. The T$_d^5$ was 524° C. (please refer to Table 1). Further, TG-DTA measurement was carried out under an air atmosphere, and the silica content was obtained according to the residue burned at 800° C. The result is presented in Table 1.

In addition, gas permeation measurement of the linear PBO (6FAP-OBC)-SiO$_2$HBD was carried out under the condition mentioned in Example 1. The obtained P and a are presented in Table 2.

Comparative Example 3

Linear PBO+Silane Coupling Agent

Inside of a three-necked flask (100 ml) equipped with a stirrer, a nitrogen introduction tube and a calcium chloride tube was replaced with nitrogen, and then 6FAP (1.83 g, 5 mmol) was metered in and completely dissolved by adding NMP (14 mL). Then BSA (4.07 g, 20 mmol) was added, and the solution was stirred at room temperature for 1 hour. The obtained reaction solution was cooled to −20° C., an isophtharic acid chloride (0.984 g, 4.85 mmol) was added, and the solution was stirred for 1 hour. Then the reaction mixture was returned to room temperature, and further stirred for 5 hours to give a NMP solution of a precursor of a linear polybenzoxazole.

In addition, the NMP solution of a precursor of a linear polybenzoxazole was put into ion-exchange water to precipitate the precursor of a linear polybenzoxazole in a solid form. Then, the polymer solid was filtered and recovered, and washed enough by ion-exchange water, and then dried in vacuo for 12 hours at 85° C.

The obtained precursor solid of a linear polybenzoxazole (1 g) was metered in a sample bottle, and dissolved again by adding NMP (3 mL). TEOSPSA (0.0174 g) was added to the solution, and it was stirred for 3 hours, and then one drop of 1N hydrochloric acid was added, and the solution was further stirred for 12 hours.

The reaction solution was casted on a polyester sheet, and dried for 3 hours at 85° C. to produce a membrane. Then, the membrane was peeled off from the polyester sheet, fixed to a metal frame, and heat-treated under a nitrogen atmosphere for 1 hour at 200° C. and for 3 hours at 400° C. to give a linear polybenzoxazole-silica hybrid (linear PBO (6FAP-IPC)-SiO$_2$HBD).

TG-DTA measurement of the linear PBO(6FAP-IPC)-SiO$_2$HBD was carried out under the condition mentioned in Example 1. The T$_d^5$ was 510° C. (please refer to Table 1). Further, TG-DTA measurement was carried out under an air atmosphere, and the silica content was obtained according to the residue burned at 800° C. The result is presented in Table 1.

In addition, gas permeation measurement of the linear PBO (6FAP-IPC)-SiO$_2$HBD was carried out under the condition mentioned in Example 1. The obtained P and a are presented in Table 2.

Comparative Example 4

Linear PBO+Silane Coupling Agent

The precursor solid of a linear polybenzoxazole (1 g) obtained in Comparative Example 3 was metered in a sample bottle, and dissolved again by adding NMP (3 mL). TEOSPSA (0.0174 g) was added to the solution, and it was stirred for 3 hours, and then one drop of 1N hydrochloric acid was added, and the solution was stirred for 12 hours.

The reaction solution was casted on a polyester sheet, and dried for 3 hours at 85° C. to produce a membrane. Then, the membrane was peeled off from the polyester sheet, fixed to a metal frame, and heat-treated under a nitrogen atmosphere for 1 hour at 200° C. and for 3 hours at 420° C. to give a linear polybenzoxazole-silica hybrid (linear PBO(6FAP-IPC)-SiO$_2$HBD).

TG-DTA measurement of the linear PBO(6FAP-IPC)-SiO$_2$HBD was carried out under the condition mentioned in Example 1. The T$_d^5$ was 511° C. (please refer to Table 1). Further, TG-DTA measurement was carried out under an air atmosphere, and the silica content was obtained according to the residue burned at 800° C. The result is presented in Table 1.

In addition, gas permeation measurement of the linear PBO (6FAP-IPC)-SiO$_2$HBD was carried out under the condition mentioned in Example 1. The obtained P and a are presented in Table 2.

TABLE 1

| Example No. | Synthetic Method | Heat-Treatment Temperature (°C) | $T_d^5$ (°C) | Terminal Modifier | Alkoxysilane | Silica Content (wt %) |
|---|---|---|---|---|---|---|
| 1 | PO method | 420 | 518 | — | — | 0 |
| 2 | PO method | 420 | 534 | — | — | 0 |
| 3 | PO method | 420 | 513 | TEOSPSA | — | 1.8 |
| 4 | PO method | 420 | 518 | TEOSPSA | — | 1.3 |
| 5 | PO method | 420 | 517 | TEOSPSA | TMOS | 10.3 |
| 6 | PO method | 420 | 517 | TEOSPSA | MTMS | 8.0 |
| 7 | PO method | 420 | 520 | TEOSPSA | MTMS | 22.5 |
| 8 | PO method | 420 | 526 | TEOSPSA | MTMS | 34.7 |
| 9 | PO method | 420 | 524 | TEOSPSA | TMOS | 22.0 |
| 10 | PO method | 400 | 513 | TEOSPSA | — | 1.5 |
| 11 | PO method | 400 | 517 | TEOSPSA | TMOS | 10.3 |
| 12 | PO method | 400 | 522 | TEOSPSA | TMOS | 18.3 |
| 13 | PO method | 400 | 517 | TEOSPSA | MTMS | 7.9 |
| 14 | PO method | 400 | 520 | TEOSPSA | MTMS | 22.5 |
| 15 | PO method | 400 | 526 | TEOSPSA | MTMS | 32.5 |
| 16 | Silylation method | 420 | 483 | TEOSPSA | — | 1.7 |
| 17 | Silylation method | 420 | 490 | TEOSPSA | TMOS | 10.5 |
| 18 | Silylation method | 420 | 494 | TEOSPSA | TMOS | 22.9 |
| 19 | Silylation method | 420 | 487 | TEOSPSA | MTMS | 6.6 |
| 20 | Silylation method | 420 | 489 | TEOSPSA | MTMS | 21.1 |
| 21 | Silylation method | 450 | 490 | IPTrMOS | — | 1.3 |
| Comparative Example | | | | | | |
| 1 | PO method | 400 | 525 | TEOSPSA | — | 1.4 |
| 2 | Silylation method | 420 | 524 | TEOSPSA | — | 1.7 |
| 3 | Silylation method | 400 | 510 | TEOSPSA | — | 1.4 |
| 4 | Silylation method | 420 | 511 | TEOSPSA | — | 1.8 |

TABLE 2

| No. | Gas Permeability Coefficient; P ($\times 10^{10}$[cm$^3$(STP)cm/cm$^2$ s cmHg]) | | | | Permselectivity; $\alpha$ | |
|---|---|---|---|---|---|---|
| | $CO_2$ | $O_2$ | $N_2$ | $CH_4$ | $O_2/N_2$ | $CO_2/CH_4$ |
| Example | | | | | | |
| 1 | 2400 | 430 | 130 | 120 | 3.2 | 21 |
| 2 | 150 | 26 | 5.6 | 3.9 | 4.7 | 38 |
| 3 | 1370 | 240 | 68 | 56 | 3.5 | 24 |
| 4 | 73 | 13 | 2.6 | 1.8 | 5.0 | 40 |
| 5 | 2210 | 370 | 88 | 60 | 4.3 | 37 |
| 6 | 2980 | 510 | 190 | 180 | 2.6 | 17 |
| 7 | 2060 | 370 | 170 | 160 | 2.1 | 13 |
| 8 | 2560 | 460 | 220 | 250 | 2.1 | 10 |
| 9 | 2571 | 377 | 200 | 91 | 1.9 | 28 |
| 10 | 524 | 96 | 26 | 18 | 3.7 | 29 |
| 11 | 769 | 134 | 35 | 26 | 3.8 | 30 |
| 12 | 1023 | 173 | 46 | 32 | 3.7 | 32 |
| 13 | 1168 | 211 | 65 | 64 | 3.3 | 18 |
| 14 | 1483 | 263 | 87 | 97 | 3.0 | 15 |
| 15 | 1927 | 351 | 123 | 147 | 2.9 | 13 |
| 16 | 513 | 91 | 23 | 17 | 4.0 | 31 |
| 17 | 815 | 134 | 35 | 26 | 3.8 | 31 |
| 18 | 1017 | 167 | 44 | 36 | 3.8 | 28 |
| 19 | 651 | 114 | 31 | 29 | 3.7 | 22 |
| 20 | 1023 | 183 | 55 | 65 | 3.3 | 16 |
| 21 | 2100 | 364 | 91 | 76 | 4.0 | 28 |
| Comparative Example | | | | | | |
| 1 | 32 | 6.3 | 2.0 | 0.84 | 3.2 | 38 |
| 2 | 40 | 7.5 | 1.4 | 1.0 | 5.4 | 38 |
| 3 | 20 | 4.6 | 0.78 | 0.40 | 5.9 | 51 |
| 4 | 24 | 5.4 | 0.91 | 0.45 | 5.9 | 52 |

Figure 5:
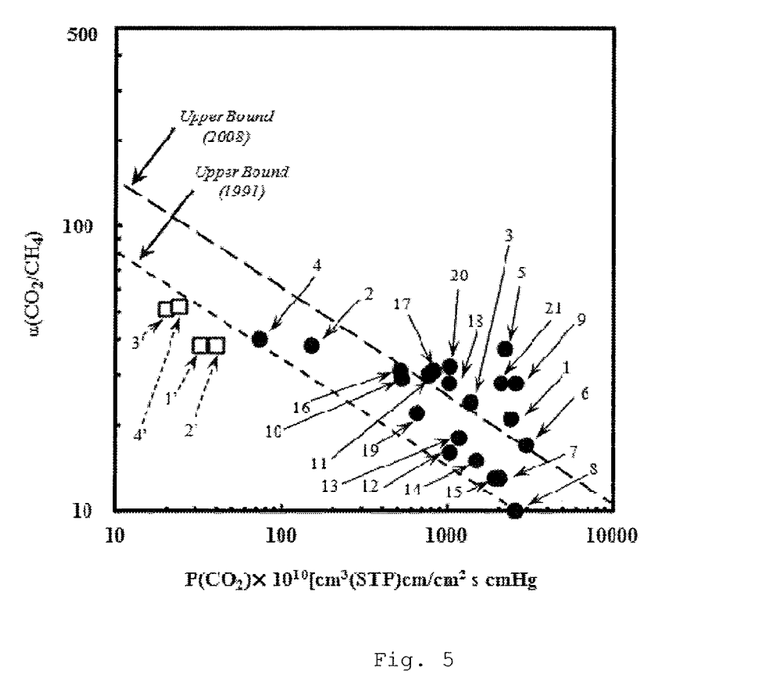
FIG. 5 shows $CO_2/CH_4$ selectivity of gas separation membranes made of a resin comprising a branched polybenzoxazole.

FIG. 5 presents a plot of the $CO_2/CH_4$ separation factors; $\alpha(CO_2/CH_4)$ obtained with regard to the branched PBO membranes of Examples 1-21 and the linear PBO membranes of Comparative Examples 1-4 versus $CO_2$ permeation coefficients; $P(CO_2)$(cm$^3$(STP)cm/cm$^2$ s cmHg). In FIG. 5, Reference numerals 1-21 display results of Examples 1-21, and reference numerals 1'-4' display results of Comparative Examples 1-4. Furthermore, in FIG. 5, the dotted lines demonstrate upper limiting (or bound) lines of $CO_2/CH_4$ separation performance with regard to polymer membranes provided by Robeson in 1991 and 2008 (please refer to non-patent documents).

The branched PBO membranes of Examples 1-21 had larger $CO_2$ permeation coefficients than the linear PBO membranes of Comparative Example 1. Particularly, hybridization of the PBO with silica makes the tendency marked.

Further, the branched PBO membranes of Examples 1-21 generally have excellent $CO_2/CH_4$ separation performance over the upper limiting line (1991).

According to the above results, the branched PBO membranes of the present invention exhibit high heat resistance and have excellent $CO_2/CH_4$ separation performance due to the branched structure.

INDUSTRIAL APPLICABILITY

The present invention provides a gas separation membrane made of a resin comprising a branched polybenzoxazole. The gas separation membrane of the present invention has excellent gas permeability and gas separation characteristic, particularly excellent carbon dioxide ($CO_2$) permeability and excellent separation characteristic of carbon dioxide to methane ($CH_4$).

RELATED APPLICATION

This patent application claims priority under Article 4 of the Paris Convention or Article 41 of the Japanese Patent Law based on Japanese Patent Application No. 2012-012226 filed on Jan. 24, 2012 in Japan, the entire content of which is incorporated herein by reference.

DESCRIPTION OF REFERENCE NUMERALS

10: Branched polybenzoxazole
20: Branched polybenzoxazole having a linear structure
30: Branched polybenzoxazole/silica hybrid
40: Branched polybenzoxazole having a linear structure/silica-hybrid

The invention claimed is:

1. A gas separation membrane comprising a resin comprising a branched polybenzoxazole which has a branched dendritic structure, wherein the branched polybenzoxazole is derived from a branched polyamide obtainable by the reaction of a polycarboxylic acid compound comprising a tri- or more-valent carboxylic acid compound with a (di)hydroxy(di)amine.

2. The gas separation membrane according to claim 1, wherein the tri- or more valent carboxylic acid compound comprises at least one selected from a group consisting of tri- or more-valent aromatic carboxylic acids, acid chlorides thereof and active esters thereof.

3. The gas separation membrane according to claim 2, wherein the tri- or more-valent aromatic carboxylic acids, acid chlorides thereof and active esters thereof comprise at least one selected from a group consisting of benzene-1,3,5-tricarboxylic acid, benzene-1,2,4-tricarboxylic acid, benzene-1,2,5-tricarboxylic acid, 2,4,6-tribromobenzene-1,3,5-tricarboxylic acid, 2,4,6-tris(dodecyloxy)benzene-1,3,5-tricarboxylic acid, 4,4',4''-benzene-1,3,5-triyl-trisbenzoic acid, 3,3',3''-benzene-1,3,5-triyl-trisbenzoic acid, 3,3',4,4'-biphenyltetracarboxylic acid, 3,3',4,4'-(1,1'-hexafluoroisopropylidenebiphenyl)tetracarboxylic acid, 1,2,3,4,5,6-benzenehexacarboxylic acid, acid chlorides thereof and active esters thereof.

4. The gas separation membrane according to claim 3, wherein the tri- or more-valent aromatic carboxylic acids, acid chlorides thereof and active esters thereof comprise at least one selected from a group consisting of benzene-1,3,5-tricarboxylic acid, acid chlorides thereof and active esters thereof.

5. The gas separation membrane according to claim 1, wherein the (di)hydroxy(di)amine comprises at least one selected from aromatic (di)hydroxy(di)amines.

6. The gas separation membrane according to claim 5, wherein the aromatic (di)hydroxy(di)amines comprise at least one selected from a group consisting of 2,4-diamino-1,5-benzenediol, 4,4'-diamino-3,3'-dihydroxybiphenyl, 3,3'-diamino-4,4'-dihydroxybiphenyl, 2,2'-bis(3-amino-4-hydroxy-phenyl)ketone, 2,2-bis(3-amino-4-hydroxyphenyl)sulfide, 2,2-bis(3-amino-4-hydroxyphenyl)ether, 2,2-bis(3-amino-4-hydroxyphenyphexafluoropropane, 2,2-bis(3-amino-4-amino-phenyl)sulfone, 2,2-bis(3-amino-4-hydroxyphenyl)propane, 2,2-bis(3-hydroxy-4-aminophenyl)propane, 2,2-bis(3-hydroxy-4-aminophenyl)methane, 2,2-bis(3-amino-4-hydroxyphenyl)-hexafluoropropane, 2,2-bis(3-amino-4-hydroxyphenyl)di-fluoromethane, 2,4-diaminoresorcinol, 2,4-diamino-3-methyl-resorcinol, 4,6-diaminorecorcinol, 4,6-diamino-2-methyl-resorcinol, 9,9-bis(4-(4-amino-3-hydroxy)phenoxyphenyl)-fluorene, 9,9-bis(4-(4-amino-3-hydroxy)phenoxy-3-methyl-phenyl)fluorene, 9,9-bis(4-(3-amino-4-hydroxy)phenoxy-phenyl)fuorene, 9,9-bis(4-(3-amino-4-hydroxy)phenoxy-3-methylphenyl)fluorene, 9,9-bis(3-amino-4-hydroxyphenyl)-fluorene, 9,9-bis(2-methyl-5-cycrohexyl-4-(4-amino-3-hydroxy)phenoxyphenyl)fluorene, 3,3'-diamino-4,4'-dihydroxybiphenylether, 3,3'-diamino-4,4'-dihydroxy-2,2'-dimethylbiphenylether, 4,4'-diamino-3,3'-dihydroxy-2,2'-dimethylbiphenylether, 1,1'-(1,4-phenylenebis(1-methyl-ethylidene))bis(3-cyclohexyl-2-methyl)-4-(4-amino-3-hydroxy)phenoxyphenyl)propane, 2,2-bis(3-cyclohexyl-4-(4-amino-3-hydroxyphenoxy)phenyl)propane, and 1,1-bis(3-cyclohexyl-4-(4-amino-3-hydroxy)phenoxyphenyl)cyclohexane.

7. The gas separation membrane according to claim 6, wherein the aromatic (di)hydroxy(di)amines comprise at least one selected from a group consisting of 2,2-bis(3-amino-4-hydroxyphenyl)hexafluoropropane and 9,9-bis(3-amino-4-hydroxyphenyl)fluorene.

8. The gas separation membrane according to claim 1, wherein the resin comprising a branched polybenzoxazole has a cross-linked structure formed by using at least one selected from a group consisting of tetracarboxylic dianhydrides, diamines, isocyanate compounds, carboxylic acid compounds, carboxylic acid halide compounds, epoxy compounds, hydroxy compounds, and polysiloxane compounds.

9. The gas separation membrane according to claim 1, wherein the resin comprising a branched polybenzoxazole is a hybrid with silica, and comprises a hybrid structure in which a polybenzoxazole portion is connected and integrated with a silica portion (represented by $SiO_2$ unit) through a covalent bond.

10. The gas separation membrane according to claim 9, wherein the silica portion is formed by a sol-gel reaction.

* * * * *